United States Patent [19]

Colvin

[11] 4,312,826
[45] Jan. 26, 1982

[54] METHOD FOR FABRICATION OF PHYSIOLOGICAL MODELS

[76] Inventor: David P. Colvin, Rte. 5, Apex, N.C. 27502

[21] Appl. No.: 86,421

[22] Filed: Oct. 19, 1979

[51] Int. Cl.³ .............................................. B29C 1/02
[52] U.S. Cl. .................................. 264/221; 264/222; 264/227; 434/81; 434/86
[58] Field of Search ............... 264/221, 222, 227, 317; 35/17, 20

[56] References Cited

U.S. PATENT DOCUMENTS 2,635,294 4/1953 Rolaston ............................ 264/221
3,789,518 2/1974 Chase ................................. 264/222
3,848,346 11/1974 Mackey ................................. 35/17

Primary Examiner—Donald E. Czaja
Assistant Examiner—W. Thompson
Attorney, Agent, or Firm—Mills & Coats

[57] ABSTRACT

This invention relates to the method of producing a flexible, life-like model of physiological organs. These models are produced by injecting under pressure for a predetermined time a settable material such as silicone. The organ is then digested in a solution leaving a solid fabricated model. A multi-layered mold is fabricated around the solid model and once formed, is disassembled to remove said model. The mold is then reassembled and after proper coating is filled with liquid wax or similar material which is permitted to solidify. The mold is again disassembled and the wax model removed. The surface of the wax model can then be polished and otherwise cleaned prior to dipping in a settable liquid such as silicone which allows a build-up coating to be applied to such wax model. The thus coated model is then placed in boiling water or other environment to melt out the core to form a hollow casting by the lost wax technique. The remaining wax residue can be removed by use of an appropriate organic scavenger solution. In the case of lungs, heart and the like, the model can then be suspended within a suitable enclosure and through the application of an electronic controlled, alternating vacuum, respiration, heart beat or the like can be simulated.

6 Claims, 11 Drawing Figures

METHOD FOR FABRICATION OF PHYSIOLOGICAL MODELS

FIELD OF INVENTION

This invention relates to model producing and more particularly to the production of accurate models of physiological organs.

BACKGROUND OF INVENTION

In the past, doctors, nurses and others concerned with the medical field have had to work with only crude models of various organs such as lungs in learning exploratory and operative techniques. No method has been available to reproduce an accurate hollow model of various organs for demonstration and training purposes.

SUMMARY OF INVENTION

After much research and study into the above-mentioned problems, the present invention has been developed to provide an accurate, realistic model of physiological organs which can accurately demonstrate the same as well as being adaptable for training purposes. This is accomplished through a series of steps including taking of an actual organ and injecting a settable material therein. The organ is then digested through a chemical solution which leaves a negative image of the organ. A mold is made from the negative image and then such image is removed. The solid model or image is then discarded and a wax likeness thereof produced in the mold. This wax image is then coated with a life-like material of appropriate texture and color and the wax core removed through standard lost wax techniques. To complete the process, any residue within the final image of the original organ is removed through the application of an appropriate organic scavenger solution and such image can then be mounted as appropriate for use. In the case of lungs, hearts, etc., an evacuated chamber with a pulsating vacuum pump can be used to simulate actual movement of a live organ for teaching, among other things, exploratory techniques.

In view of the above, it is an object of the present invention to provide a method for producing an almost exact replica of the interior of a physiological organ down to minute detail.

Another object of the present invention is to provide a means for producing a replica of a physiological organ which simulates the same in color, feel, and shape.

Another object of the present invention is to provide a method of producing a demonstration and training model of the interior of a physiological organ.

Another object of the present invention is to provide a nine-step process for producing a model which duplicates in accurate detail the interior of a physiological organ.

Other objects and advantages of the present invention will become apparent and obvious from a study of the following description and the accompanying drawings which are merely illustrative of such invention.

DETAILED DESCRIPTION OF INVENTION

Figure 1:
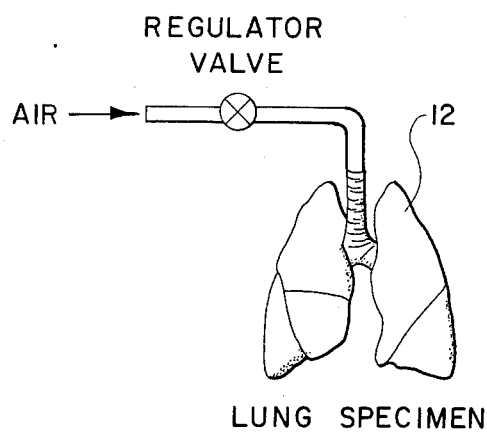
FIG. 1 is a schematic view of a lung specimen being inflated and dried.
Figure 2:
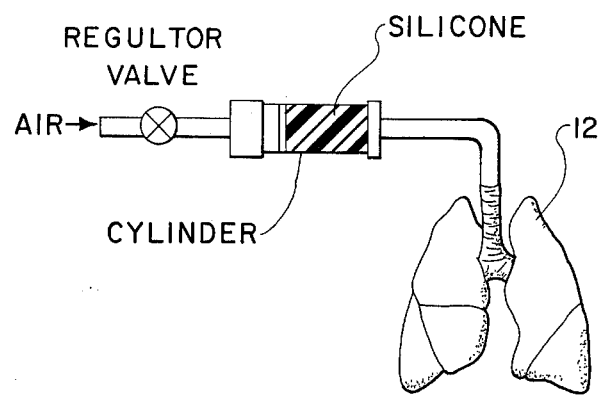
FIG. 2 is a schematic view of the pressurized injection filling process.
Figure 3:
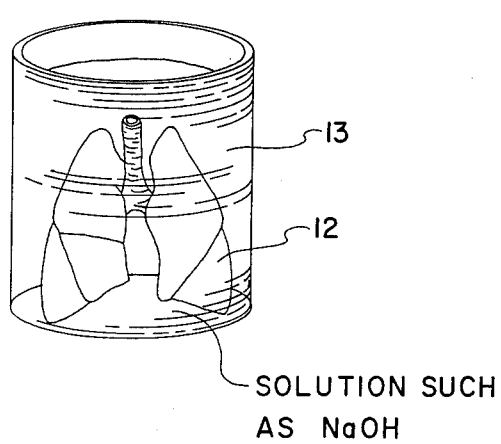
FIG. 3 is a schematic view of the tissue digestion process.
Figure 4:
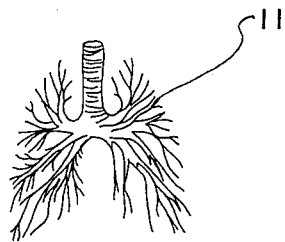
FIG. 4 is a perspective view of the solid model after tissue digestion.
Figure 5:
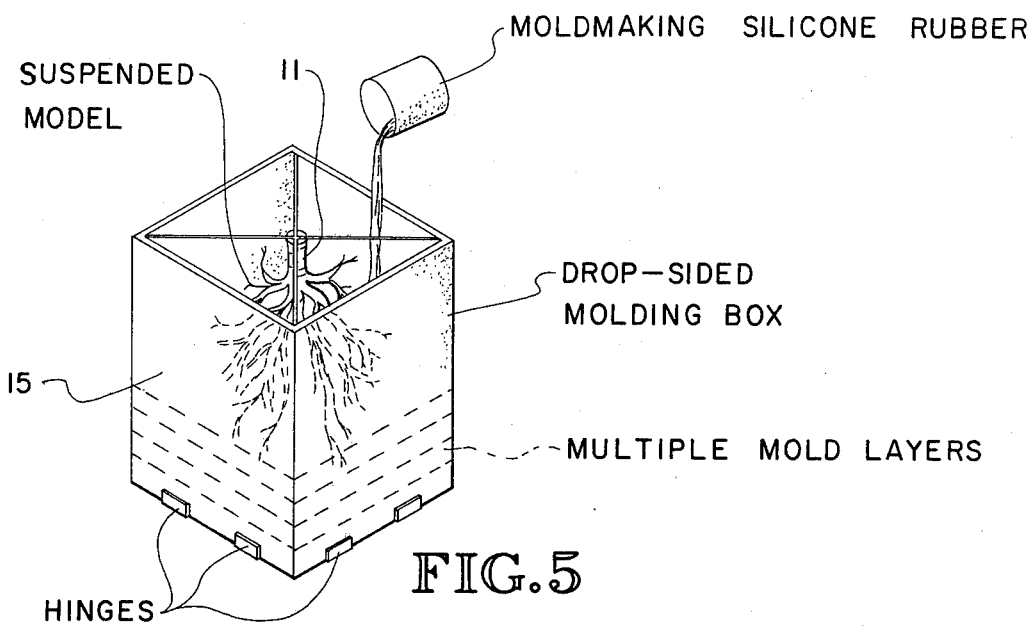
FIG. 5 is a perspective view of the production of the male model from the solid model shown in FIG. 4.
Figure 6:
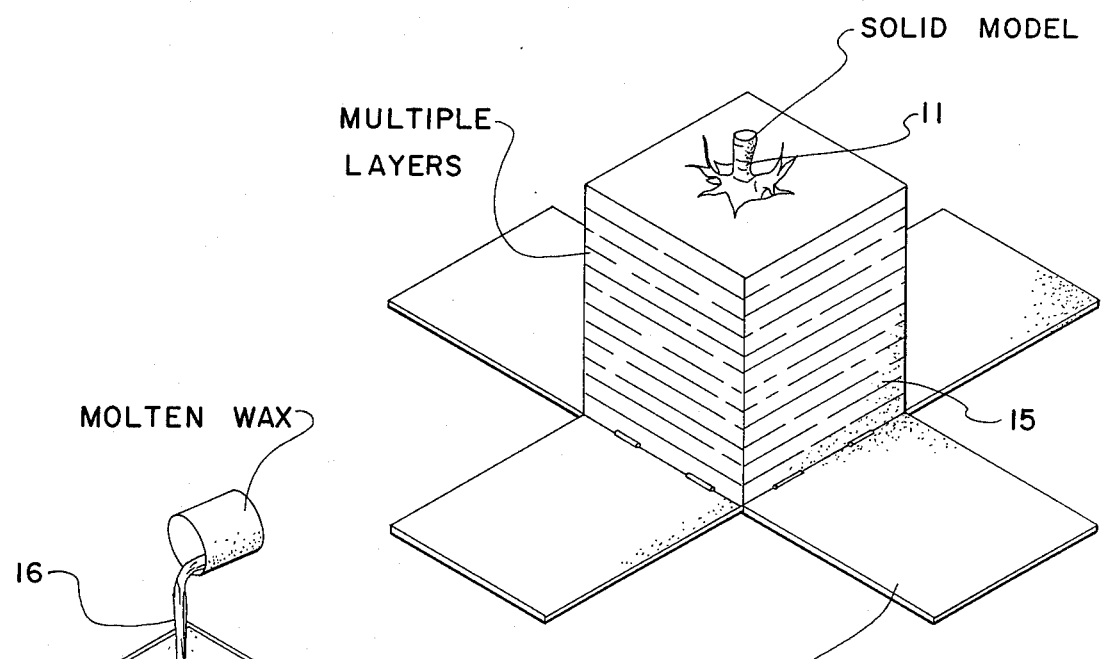
FIG. 6 is a perspective view of the removal of the solid model from the model.
Figure 7:
FIG. 7 is a perspective view of the production of the wax model.
Figure 8:
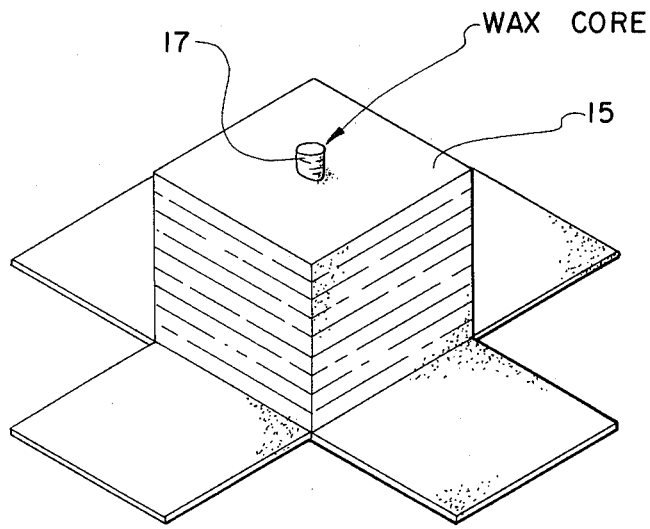
FIG. 8 is a perspective view of the removal of wax model from the mold.
Figure 9:
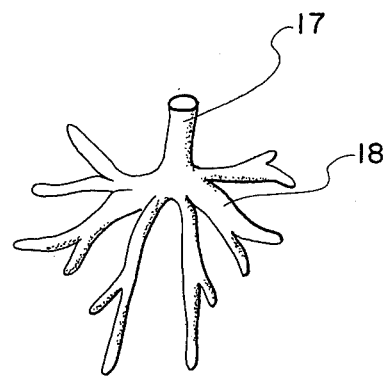
FIG. 9 is a perspective view of the coating of the wax model.
Figure 10:
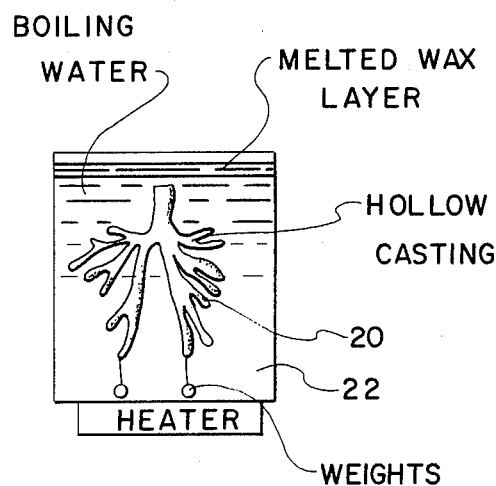
FIG. 10 is a schematic view of the heat removal of the wax core.
Figure 11:
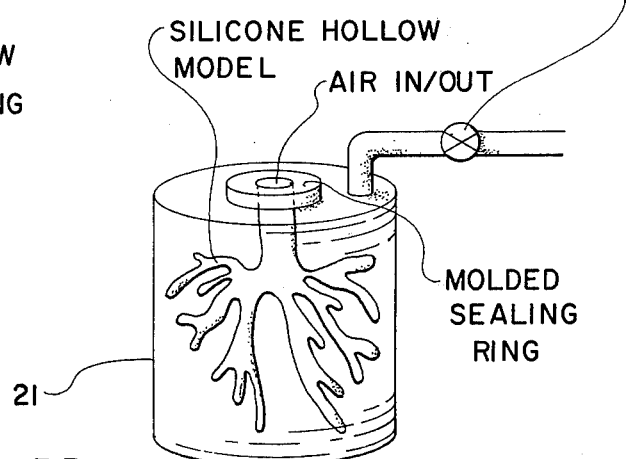
FIG. 11 is a schematic view of the flexible hollow lung model disposed within a vacuum chamber for pulsation simulating organ functioning.

Efforts in the past have been on solid models of bronchial passageways or rigid hollow models that do not give an actual simulation to the breathing pattern of the lung. The present techniques have been developed for casting both solid and hollow lung models from human lung specimens. To make a solid model, an air hose with dry air under pressure is connected to the trachea such that the air causes fluid in the lung to weep from the pleural surface. Into the dry, spongy lung, silicone is injected through the trachea to a level dependent upon details of the lung airways needed. The dry lung with cured silicone inside is placed within a NaOH solution to digest lung tissues. A coat of sodium salicylate is applied on the washed and cleaned solid model for preservation.

The fabrication of the hollow model utilizes the lost wax technique. The solid model is mounted firmly inside a mold box and a sandwich mold is made with mold-making rubber by pouring around the solid model in the mold when the solid model is covered with the layers, the supporting sides of the box are removed and the mold is carefully disassembled to permit removal of the solid silicone core. Liquid wax is poured into the reassembled mold and a wax model is thus obtained. The wax model is coated with silicone rubber in a controlled atmosphere. Numbers of coatings are given such that a good thickness has been achieved. When cured, the wax is boiled off to form the hollow model and a cap is attached to the trachea for mounting in the breathing chamber.

An electronic oscillator has been designed to simulate a breathing pattern. When vacuum is applied by activating the "on" button, air from the ambient rushes in to expand the hollow model. The vacuum can be adjusted, if needed, to selective breathing patterns (i.e., heavy, medium, light) by controlling the frequency and duty cycle knobs. After inhalation, the oscillator pauses, then exhales air. The system repeats itself for as long as the power remains on and can be stopped at any phase by operating the "hold" button. The advantages of this method are quite clear. The inside of the collapsible model is accurate in color, detail, and feel to the inside of the actual original lung specimen. A number of identical hollow models can be made from the same laminated mold. Hollow lung models have been successfully made to the sixth generation which is the practical limit to which the fiber bronchoscope is used.

Techniques have been developed for casting accurate physiological models from biological specimens for research, display, and educational purposes. Solid models 11 of the passageways in the selected organs 12 are produced by casting a suitable material such as silicone within the specimen itself and later digesting the tissue with an appropriate chemical solution 13. During the process, the casting material is injected into the selected organ using a particular pressure versus time program which is used to control the detail to which the model is fabricated. It has been demonstrated that the solid model 11 castings thus obtained are accurate reproductions of the organ's passageways and can be used to accurately determine sizes and interior orientations and angles. In addition, such models are useful for educational purposes, the training of medical students, and the fabrication of hollow castings or models of the organ's interior surfaces. These hollow models provide a realistic and elastic training tool for clinical personnel using endoscopic equipment and instrumentation.

A technique has also been developed for reproducing multiple hollow physiological models 14 from a single biological specimen. This technique involves the fabrication of a multi-layered mold 15 around the solid passageway model 11. The mold 15 is disassembled, the solid model 11 is removed, and the mold is reassembled. Liquid hot wax 16 is poured into the mold 15 and permitted to solidify. The mold is once again disassembled and the wax solid metal 17 is removed. The surface 18 of the wax core is thermally polished to remove roughness and the mold's parting lines. It is then repeated dipped into a prepared mixture of liquid silicone 19 to build up a specific coating 20 of the desired color, thickness, and characteristics. The wax core 17 is placed in boiling water 22 and melted out of the hollow casting using the lost wax technique. Wax residue remaining within the casting is removed by further rinsing of the hollow model using an appropriate organic scavenger solution. In the case of the lungs, the hollow model may be further improved by suspending the unit within a suitable enclosure 21 and applying an electronically-controlled, alternating vacuum to the enclosure to simulate respiration. Not only does this breathing action add realism during bronchoscopic training, but the model has been used for research to accurately model the deposition of asbestos fibers within the lung.

From the above, it is obvious that the present invention has the advantage of providing an accurate model of the interior of a physiological organ which can be used for demonstration and training purposes. The texture, color, and feel of the original organ can be closely simulated by the present method and in the case of moving organs such as lungs, hearts, etc., functioning can be simulated through use of a pulsating vacuum system.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. The method of fabricating an accurate model of a selected physiological organ comprising: injection of a casting material under pressure directly into the biological specimen to be molded and maintaining said pressure until desired physiological detail is obtained; digestion of the tissue of the organ in an appropriate chemical solution whereby a solid model of the interior of the organ is produced; casting of a mold about the solid model; removal of the thus cast mold from said model; casting a core within said mold out of a settable, dissolvable material; removing said core from said mold; coating said core with a settable material to form a reproduction of the interior of the physiological organ; and dissolving a core to form a hollow model whereby an improved demonstration and training device is produced.

2. The method of claim 1 wherein the mold is produced through a multi-layered molding technique.

3. The method of claim 1 wherein the core is a wax-like material.

4. The method of claim 3 wherein the wax-like material is removed through a heating process.

5. The method of claim 3 wherein any core residue is removed from the final model through use of a scavenger solution.

6. The method of claim 1 wherein the material coating the core to produce the hollow model resembles in color, feel and texture the tissue of the physiological organ.

* * * * *